United States Patent [19]

Lindsey et al.

[11] 3,798,976

[45] Mar. 26, 1974

[54] ROTOR TILT

[75] Inventors: James M. Lindsey, Houston; Thomas W. Stell, Richmond, both of Tex.

[73] Assignee: Sperry-Sun Well Surveying Company, Sugar Land, Tex.

[22] Filed: Sept. 19, 1972

[21] Appl. No.: 290,285

Related U.S. Application Data

[62] Division of Ser. No. 38,263, May 18, 1970, Pat. No. 3,703,832.

[52] U.S. Cl. .............................. 74/5.6 A, 33/363 K

[51] Int. Cl. .............................................. G01c 19/48

[58] Field of Search ............. 74/5.4, 5.42, 5.6, 5.43, 74/5.8; 33/366, 363 K, 312

[56] References Cited

UNITED STATES PATENTS

| | | | |
|---|---|---|---|
| 2,916,918 | 12/1959 | Jones | 74/5.43 X |
| 3,489,017 | 1/1970 | Parker | 74/5.6 |
| 3,599,494 | 8/1971 | Lichte, Jr. | 74/5.6 |
| 3,261,213 | 7/1966 | Zeldman et al. | 74/5.6 |
| 2,378,744 | 6/1945 | Annen | 74/5.8 X |

FOREIGN PATENTS OR APPLICATIONS

| | | | |
|---|---|---|---|
| 886,423 | 1/1962 | Great Britain | 33/363 K |

*Primary Examiner*—Manuel A. Antonakas
*Attorney, Agent, or Firm*—George L. Church; Donald R. Johnson; John E. Holder

[57] ABSTRACT

A system for controlling the tilt of a rotor on a gyro includes a sensing device on the rotor housing for detecting tilt, together with light generating devices mounted on opposite sides of the rotor housing and responsive to the tilt detecting device. Light sensors are mounted on the gyro housing and are responsive to light from the light generating devices on the rotor housing. The light detecting devices provide a control signal to a torqueing motor to apply a corrective force to the gyro system. The torque motor is continuously operated, and will rotate in a first direction until a signal is received from at least one of the light sensing devices, whereupon the direction of rotation reverses until light is not detected by one of the sensors. Use of the light activated control system to transmit the error signal obviates the use of any friction-producing physical attachment with the components of the gyro in order to transmit such error signal to the torque motor control system.

9 Claims, 3 Drawing Figures

13 29 11 32 31 28 12 21 33 39 38 36 34 37 (-) 46 42 19 33 57 54 58 56 51 53 51 51 52 26 22 17 23 27 24 (+) 16

ROTOR TILT

This is a division of application, Ser. No. 38,263, filed May 18, 1970 and now U.S. Pat. No. 3,703,832.

BACKGROUND OF THE INVENTION

This invention relates to a gyro control, and more particularly, to a system for maintaining the rotor of a gyro in a predetermined attitude. In a typical gyro control system, some sort of physical attachment is used to detect gyro tilt and transmit the indication of such tilt to a restoring device. A torque motor is normally used to apply a torqueing force to the vertical axis of the gyro in order to correct tilt of the inner gimbal or rotary housing. Although slip rings and the like, which have been used in the past for such purposes, minimize the amount of external torque or force upon the gyro components, slip rings or any other type of physical attachment to the vertical or horizontal components of a gyro are undesirable because they do cause friction to some degree, which creates drift and tilt in the gyro. It is therefore desirable to find a frictionless means of transferring an indication of tilt from these components to a control function or in the present case, a torque motor. The torque motor then exerts the necessary force on the vertical axis of the gyro to maintain the rotor axis in some desired positional relationship.

It is therefore an object of the present invention to provide a new and improved gyro control system.

SUMMARY OF THE INVENTION

With this and other objects in view, the present invention contemplates a gyro control system responsive to a tilt indicating device. A level detector on a gyro component develops a control signal for activating an energy emanating means on the gyro component. Detectors on an inactive portion of the gyro housing sense emanated energy and in response thereto provide a control signal to a torqueing motor. The torque motor drives a device for applying a restoring force to a gyro component.

A complete understanding of this invention may be had by reference to the following detailed description, when read in conjunction with the accompanying drawings illustrating embodiments thereof.

DESCRIPTION OF THE PREFERRED EMBODIMENTS

Figure 1:
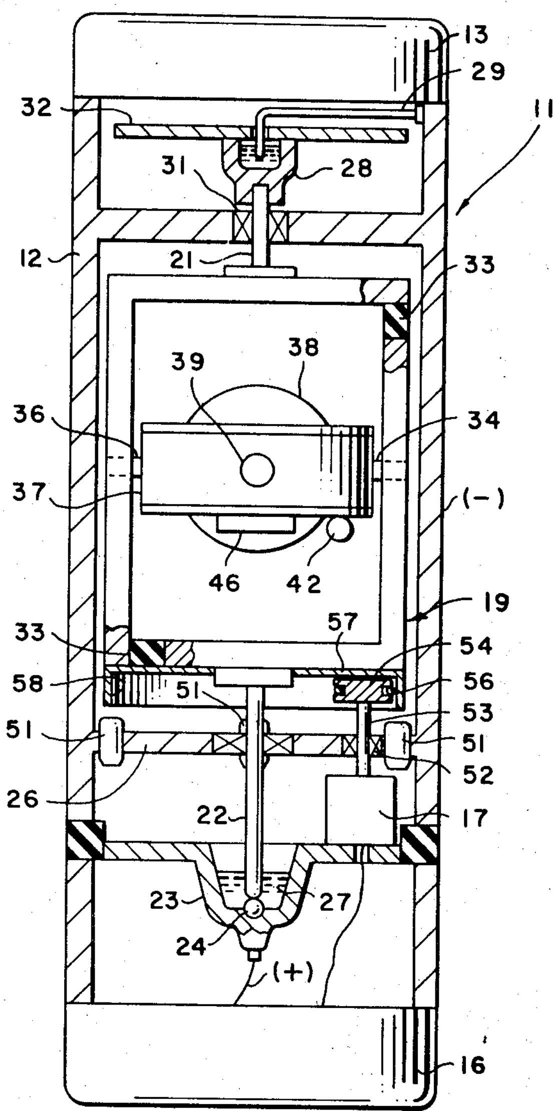
FIG. 1 is a partial cross-sectional view of a wellbore instrument embodying a gyro control system in accordance with the present invention.

Referring first to FIG. 1 of the drawings, a wellbore tool 11 is shown having a housing 12 for encasing a gyro instrument. A photographic recording apparatus or the like may be mounted in a section 13 above the gyro for making readings indicative of the gyro position. Alternatively, circuitry may be provided for transmitting a signal to the surface via a cable, which signal may be utilized to provide an instantaneous recording or read-out representing the gyro position. Below the instrument section is an electrical section 16 including a power supply and circuitry for controlling the operation of the torqueing motor 17. Th outer gimbal 19 of the gyro has upwardly and downwardly extending vertical shafts 21, 22 respectively, which in turn are supported by bearings for rotation within the instrument housing. At the lower end of the lower vertical shaft 22, a cup 23 is provided within the housing for receiving the lower end of the shaft and the bottom of the cup to furnish a pivotal support for the shaft. Annular bearings (not shown) are provided between the shaft 22 and a horizontal partition 26 within the housing for support in a horizontal direction. The cup 23 is filled with mercury or some such conducting fluid 27, so that an electrical current applied to the bottom of the cup is transmitted by means of the conducting fluid to the vertical shaft 22 of the gyro. At the upper end of the gyro, the upwardly extending vertical shaft 21 likewise has a mercury filled cup 28, mounted thereon. A wiper wire 29 extends inwardly from the wall of the housing 12, and is bent to extend downwardly into the mercury filled cup 28 to form a second conducting path to the gyro. The upper shaft 21 is supported in a horizontal direction by annular bearings 31. An instrument face 32 may be connected to the upper end of the cup or shaft to provide indications of the gyro position. Photographic apparatus in section 13 is used to record the position of the instrument face. The vertical shafts 21, 22 are in electrical communication with the outer gimbal of the gyro. Insulating members 33 are positioned in the gimbal walls so that the gimbal is divided into two separate conducting paths. These conducting paths in turn are in communication with opposed horizontal shafts 34, 36 which are received within opposed walls of the outer gimbal and which extend inwardly to support an inner gimbal 37 of the gyro. The inner gimbal of the gyro is pivotally mounted on such horizontal shafts 34, 36 and supports a rotor (not shown) within a rotor housing 38. The rotor is mounted about another horizontal shaft 39 perpendicular to the shafts 34, 36 of the inner gimbal. As is well known in the construction of such gyro instruments, the inner gimbal 37 is divided into separate insulated portions similarly to the outer gimbal, which portions provide separate conducting paths from the shafts 34, 36 to the rotor for supplying power to the rotor.

A level detecting switch 42 is mounted on the bottom side of the inner gimbal 37 parallel with the rotor shaft 39. Light sources such as small neon lamps 46 are mounted on the bottom side of the inner gimbal 37 and on opposite sides thereof perpendicular to the rotor shaft 39. Electrical power which is used to drive the rotor motor is also used to operate the neon lamps 46 in series with the switch 42. Light detectors 51, which may be in the form of photocells or other light sensitive devices, are positioned at spaced locations about the periphery of the tool housing below the outer gimbal 19. In the embodiment of the apparatus shown in FIG. 1, the light detectors are placed at four equidistant locations about the inner wall of the housing in the horizontal partition 26.

As has been described with respect to the Background of the Invention, it is desirable to maintain the rotor housing of a gyro in either a true horizontal position relative to earth, or in some fixed position with respect to the vertical or outer gimbal. It is first necessary to detect any changes in the attitude of the inner gimbal with respect to such fixed or desired position in order to make corrections, through a torqueing motor system, for such changes. The torque motor 17 is mounted within the housing 12 below the horizontal partition 26. A ball bearing 52 is provided in the partition to support an output shaft 53 on the motor 17. A grooved wheel 54 is mounted on the upper end of shaft 53. A rubber or otherwise pliant ring member 56 is positioned in the groove in the wheel 54. A cup-shaped element 57 is provided on the lower surface of the other gimbal 19 and serves as a friction receiving member. The element 57 has a vertical surface 58 which is arranged in close proximity with the outer peripheral surface of the grooved wheel 54. The ring member 56 is normally not in contact with the surface 58 unless the wheel 54 is rotating, which in accordance with the operation of the apparatus is constantly occurring.

Figure 3:
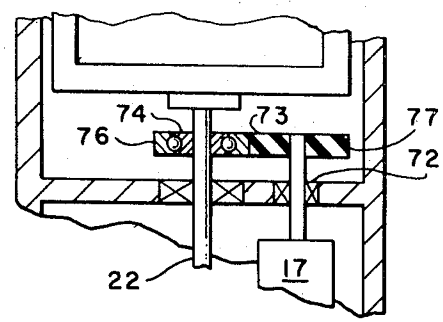
FIG. 3 is an alternative arrangement of an apparatus for transmitting a torqueing force from the motor to a component of the gyro system.

Referring next to FIG. 3 of the drawings, an alternative arrangement of the corrective force transmitting device is shown. The torque motor 17 is shown mounted within the housing 12. An output shaft 71 extends through horizontal member 26 and is supported therein by means of bearing 72. A rubber wheel 73 is positioned on the shaft. The vertical axis 22 of the outer gimbal is likewise mounted for rotation within the member 26. A bearing 74 is mounted on the shaft 22 and is arranged so that its outer peripheral surface 77 is contacted by a mating peripheral surface 76 on the rubber wheel 73. Of course a gear arrangement may be employed to transmit the movement of the wheel to the bearing by providing compatible gear teeth on the respective surfaces 77 and 76.

Figure 2:
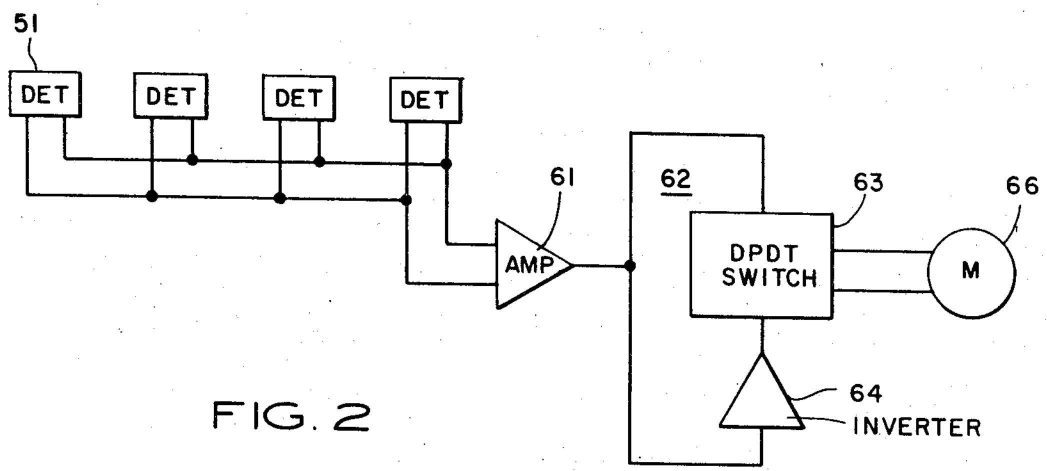
FIG. 2 is a schematic circuit diagram of electronic circuitry for providing control to a torqueing motor.

Referring next to FIG. 2 of the drawings, the electrical circuitry portion of the system, which is mounted in section 66 of the tool housing is shown in conjunction with the light sensitive devices 51. The light sensitive devices 51 are shown connected in parallel with an amplifier 61. The amplifier signal feeds a loop 62 including a solid state double pole double throw switch 63 in a bridge configuration and having an inverter 64 connected to one of its input lines. The output of the switch is connected to a reversible motor 66.

The electrical circuitry section 16 of the housing includes a power supply for driving the gyro rotor. The power supply signal is applied to the rotor in the manner described above by means of separate insulated sections of the gimbal housing for providing current paths. Since the power signal is available to the rotor, the signal is easily furnished to the level switch and neon lamps mounted on the rotor housing. The neon lamps are connected in series with the level switch.

Although the system will be described herein as maintaining the rotor in a true horizontal position, it is readily seen that the rotor could be maintained in any desirable position with a tilt detector or the like being determinative of the movement of such rotor housing from that desired position. The level detector 42, which is mounted on the rotor can be any of a number of devices having the capability of detecting tilt, and may be either of a variable impedence configuration, or a straight on-off type switch of the single pole, single throw configuration such as a simple mercury switch.

In the operation of the apparatus described above, while the gyro is operating, forces are acting upon its components which tend to cause a precessing moment, which in turn causes the rotor housing 38 to tilt about its axes 34, 36. It is desirable for reasons described above to maintain such rotor housing in a constant plane, whether it be a plane horizontal to the earth's surface or one perpendicular to the vertical axis of the borehole tool. In any event, a level switch 42 mounted on the rotor housing is arranged so that when it tilts from its predetermined plane, contact is made within the switch which completes an electrical circuit. The circuit path, which is completed by the switch includes a pair of neon lamps 46, which are mounted on opposite sides of the lower side of the rotor housing. Activation of these lamps causes light emanating therefrom to be detected by the light detecting devices 51 mounted about the periphery of the interior bore of the housing 12 below the gyro. These light detectors, which in the present configuration number four, and are evenly spaced about the housing, are connected in parallel so that a light detected by any one of the detectors causes a signal to be applied (FIG. 2) to the amplifier 61 in the control circuit. This amplifier in turn provides an output signal which is applied to both sides of a loop circuit 62. An inverter 64 in the circuit causes a signal of opposite polarity to be applied to one side of a double pole double throw switch than is applied to the other side. The solid state switch 63 thus produces a signal to the motor 66 for driving the motor in a first direction. The motor will in turn drive in this direction and causes the wheel on its output shaft to engage the friction receiving member connected to the vertical shaft of the gyro. Rotation of the wheel causes the rubber ring positioned within a groove therein to expand outwardly into contact with the inner surface of the friction receiving means thereby applying a frictional force to such surface. This force is transmitted through the vertical axis of the gyro to the gyro mechanism causing a precessing moment in the mechanism which tends to move the gyro rotor housing. The housing which has already been tilted by some forces acting thereon will now tend to move in an opposite direction until it has become leveled, at which time the switch 42 will break its contact which in turn causes the lamps to be inactivated wherein no light is detected by the detectors 51. Thereafter, the output of the amplifier is zero, which is opposite to the output seen by one side of the double pole double throw switch so that the switch is operated in an opposite mode causing a reverse polarity of power applied to the motor, which causes the motor to reverse. Reversal of the motor then in turn as described above, applies a frictional force to the gyro parts in an opposite direction causing the rotor housing to precess whereupon the level switch will again detect an untilted condition, again reversing the motor direction. This constant reversal of the motor and precessing force applied to the gyro apparatus with the consequent reverse tilting of the rotor housing takes place constantly in accordance with the arrangement described above. Of course, it is seen that various arrangements of the electrical circuitry will permit other operations of the corrective force applying motor.

When the torque motor is moved in first one direction and then another, its grooved wheel is likewise rotated therewith, whereupon the belt or rubber ring member is extended outwardly slightly due to centrifugal force into contact with the inner vertical surface of the friction receiving member connected to the vertical gimbal of the gyro. The use of the belt or rubber member as a torque transmitting means provides a very inefficient transmission means so that only a slight amount of the work provided by the rotating wheel is transmitted to the friction receiving member. Thus the slight frictional force which is transmitted is adequate to provide sufficient restorative precessing force to the gyro apparatus.

In the alternative embodiment shown in FIG. 3, the restoring force supplied by the torque motor is transmitted to a rubber wheel having its outer peripheral surface 77 in constant contact with the mating surface 76 of the bearing 74 positioned on the vertical shaft of the gyro. Thus when the torque motor 17 is operated, the bearing is rotated about the shaft 22 with the slight friction generated between the balls of the bearing and the shaft providing the slight restorative force necessary for precessing the gyro. It is noted that because the force of the ball bearings is applied to the outer diameter of the shaft 22 the moment arm of the force, that is, the radius of the shaft, is much less than in the embodiment of FIG. 1 and therefore, the friction generated between the ball bearings and the axis 22 is of less moment than that applied to the friction receiving member of FIG. 1.

While a particular embodiment of the present invention has been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. In a gyroscope apparatus having a rotor, rotor housing, and vertical gimbal positioned within a gyro housing, means for controlling the tilt of the rotor housing, means for controlling the tilt of the rotor housing, which means comprises: selectively operable energy emanating means on the rotor housing; rotor housing tilt detection means for operating said energy emanating means; means on the gyro apparatus for detecting emanated energy and for providing an electrical signal in response thereto; and means responsive to such electrical signal for applying a restorative force to the gyroscope apparatus.

2. The apparatus of claim 1 wherein said energy emanating means is a light source and said tilt detection means is a gravity sensitive switch for applying electrical power to said light source.

3. The apparatus of claim 2 wherein said means for detecting emanated energy is a plurality of light sensitive devices mounted on said gyro housing and said restorative force applying means is a reversible motor having its output operably connected with the vertical gimbal, wherein said light sensitive devices are operable to provide a switching function in the operation of said reversible motor.

4. In a gyroscopic apparatus having a rotor, rotor housing and outer gimbal mounted within a gyro housing, a control system for maintaining the rotor housing in a predetermined positional relationship, including: light source means on said rotor housing; position sensitive means on said rotor housing for operating a first circuit path including a power source for said light source means; selectively operable means for applying a force to the outer gimbal; a motor for driving said force applying means; and means on the gyroscopic apparatus for detecting light emanating from said light source means for operating a second circuit path including a power source for said motor.

5. The apparatus of claim 4 wherein said light source means includes a pair of lamps mounted on opposite sides of said rotor housing.

6. The apparatus of claim 4 wherein said light detecting means includes a plurality of evenly spaced light sensitive devices arranged about the interior of the gyro housing.

7. The apparatus of claim 4 wherein said position sensitive means includes a mercury switch which is operable upon tilt of the switch from a horizontal plane.

8. The apparatus of claim 4 wherein said force applying means includes an element selectively engagable with portions of said outer gimbal upon operation of said motor.

9. The apparatus of claim 4 wherein said motor is reversible and further including means in said second circuit path for reversing the operation of said motor upon each change in the on and off condition of said light detecting means.

* * * * *